United States Patent [19]

Springer et al.

[11] Patent Number: 5,310,886

[45] Date of Patent: May 10, 1994

[54] AZO COMPOUNDS WHICH CONTAIN A 1-SULFO-6-CARBOXY-2-AMINONAPHTHALENE DIAZO COMPONENT RADICAL AND USE THEREOF AS DYES

[75] Inventors: Hartmut Springer, Königstein/Taunus; Kurt Hussong, Bad Soden am Taunus, both of Fed. Rep. of Germany

[73] Assignee: Hoechst Aktiengesellschaft, Frankfurt am Main, Fed. Rep. of Germany

[21] Appl. No.: 867,184

[22] PCT Filed: Dec. 17, 1990

[86] PCT No.: PCT/EP90/02201

§ 371 Date: Jun. 25, 1992

§ 102(e) Date: Jun. 25, 1992

[87] PCT Pub. No.: WO91/09914

PCT Pub. Date: Jul. 11, 1991

[30] Foreign Application Priority Data

Dec. 29, 1989 [DE] Fed. Rep. of Germany ....... 3943287

[51] Int. Cl.$^5$ .................. C09B 62/507; D06P 1/38
[52] U.S. Cl. .................. 534/638; 534/617; 534/632; 534/635; 534/636; 534/637; 534/642
[58] Field of Search ............. 534/617, 632, 635, 636, 534/637, 638, 642

[56] References Cited

U.S. PATENT DOCUMENTS

| | | | |
|---|---|---|---|
| 4,341,699 | 7/1982 | Tezuka et al. | 534/638 |
| 4,378,313 | 3/1983 | Kayane et al. | 534/638 |
| 4,845,203 | 7/1989 | Dietz et al. | 534/637 |

FOREIGN PATENT DOCUMENTS

| | | |
|---|---|---|
| 0128034 | 12/1984 | European Pat. Off. . |
| 0239847 | 10/1987 | European Pat. Off. . |
| 0261079 | 3/1988 | European Pat. Off. . |
| 0264136 | 4/1988 | European Pat. Off. . |
| 0266735 | 5/1988 | European Pat. Off. . |
| 0324373 | 7/1989 | European Pat. Off. . |
| 59-136354 | 8/1984 | Japan ................ 534/617 |
| 60-23453 | 2/1985 | Japan . |
| 59-133261 | 2/1985 | Japan . |
| 62-220538 | 9/1987 | Japan . |
| 03-192159 | 8/1991 | Japan ................ 534/617 |

*Primary Examiner*—Mary C. Lee
*Assistant Examiner*—Fiona T. Powers

[57] ABSTRACT

There are disclosed azo compounds conforming to formula (1) shown and defined hereinafter, and the preparation thereof. They have fiber-reactive properties and are used for preparing strong and fast dyeings on hydroxy- and/or carboxamido-containing material, preferably fiber material, such as synthetic polyamide, wool and in particular cellulose fibers.

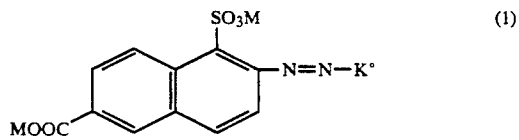

(1)

where:

M is hydrogen or a salt-forming metal,
$K^o$ is a radical of the formula (2A) or (2B)

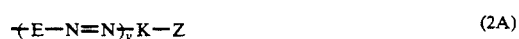

(2A)

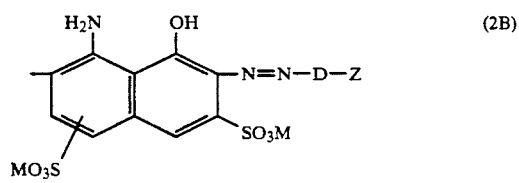

(2B)

where
Z is a radical of the formula (3)

(Abstract continued on next page.)

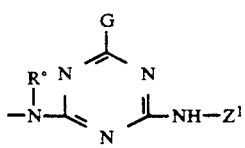 (3)
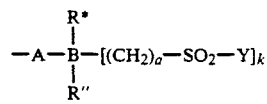 (3a)
—alk—SO$_2$—Y
where R$^o$ is hydrogen or lower alkyl which may be substituted by certain substituents, G is halogen, methoxy, hydroxy or substituted or unsubstituted anilino, Z$^1$ is a radical of the formula (3a) or (3b)
and wherein A, B, R*, R'', Y, a, k, D, E and K are as defined in the specification.
21 Claims, No Drawings

AZO COMPOUNDS WHICH CONTAIN A 1-SULFO-6-CARBOXY-2-AMINONAPHTHALENE DIAZO COMPONENT RADICAL AND USE THEREOF AS DYES

The present invention relates to the field of fiber-reactive azo dyes.

Fiber-reactive azo dyes having 2-aminonaphthalenedisulfonic acids as diazo component are known in large numbers, for example from Japanese Patent Application Publications Sho-59-133 216, Sho-60-23 453 and Sho-62-220 538 and from European Patent Application Publications Nos 0 128 034 and 0 239 847. The ever higher standards expected of the quality, the economics and the brilliance of dyeings have made it necessary to develop new azo dyes which possess improved properties in these respects and are simple to use The present invention, then, provides novel azo compounds which conform to the formula (1)

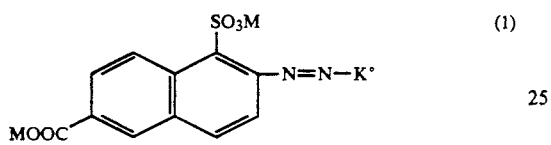   (1)

where

M is hydrogen or a salt-forming metal atom, in particular an alkali metal atom, such as sodium, potassium or lithium, $K^o$ is a radical of the formula (2A) or (2B)

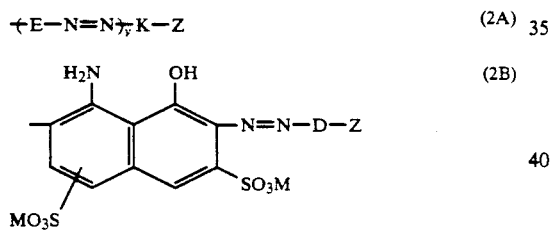

where

M is as defined above,

Z is a radical of the formula (3)

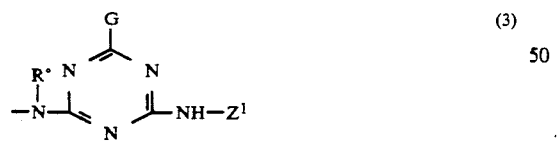   (3)

where $R^o$ is hydrogen or alkyl of 1 to 4 carbon atoms, such as methyl or ethyl, or is alkyl of 1 to 4 carbon atoms, such as ethyl, which is substituted by sulfo, carboxyl, sulfato, phosphato, hydroxyl, methoxy, ethoxy, phenyl, monosulfophenyl or disulfophenyl, the preferred meaning being hydrogen, G is halogen, such as fluorine or chlorine, methoxy, hydroxyl or a substituted or unsubstituted anilino radical which may contain a fiber-reactive group, such as, for example, a phenylamino radical which may be substituted by a fiber-reactive group of the formula -SO$_2$-Y, where Y is as defined hereinafter, and/or substituted by 1 or 2 substituents selected from the group consisting of methyl, ethyl, methoxy, ethoxy, chlorine and sulfo, and $Z^1$ is a radical of the formula (3a) or (3b)

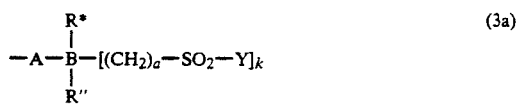   (3a)

   (3b)

where

A is a direct bond, alkylene of 2 to 6 carbon atoms, or phenylene which may be substituted by 1 or 2 substituents selected from the group consisting of methyl, ethyl, methoxy, ethoxy, chlorine, sulfo and carboxyl, B is a benzene or naphthalene radical, R* is hydrogen, alkyl of 1 to 4 carbon atoms, such as ethyl and in particular methyl, alkoxy of 1 to 4 carbon atoms, such as ethoxy or in particular methoxy, fluorine, bromine, chlorine, sulfo, carboxyl, carbalkoxy of 2 to 5 carbon atoms, such as carbomethoxy and carboethoxy, trifluoromethyl, carbamoyl or N-(C$_1$-C$_4$-alkyl)carbamoyl, preferably hydrogen, methoxy or methyl if B is a benzene ring, or is hydrogen or sulfo if B is a naphthalene ring, R" is hydrogen, alkyl of 1 to 4 carbon atoms, such as ethyl and in particular methyl, alkoxy of 1 to 4 carbon atoms, such as ethoxy or in particular methoxy, chlorine, nitro or sulfo, preferably hydrogen, methoxy, ethoxy, methyl or sulfo if B is a benzene ring, or is hydrogen or sulfo if B is a naphthalene radical, Y is vinyl or an ethyl group which contains in the β-position a substituent which is eliminable under alkaline conditions to leave a vinyl group, the Y in the subformula G being identical to or different from the Y in the group bonded to B, alk is alkylene of 2 to 6 carbon atoms, preferably 1,3-propylene, a is zero, 1 or 2, preferably zero, and k is 1 or 2, preferably 1, D is a radical of the formula (4)

   (4)

where

M is as defined above, $R^1$ is hydrogen or alkyl of 1 to 4 carbon atoms, such as ethyl or in particular methyl, and the -SO$_3$M group is preferably bonded to the benzene nucleus in the ortho-position relative to the free bond attached to the azo group, E is a radical of the formula (5a), (5b), (5c) or (5d)

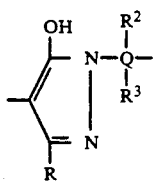 (5a)

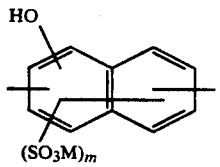 (5b)

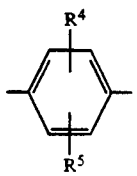 (5c)

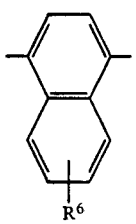 (5d)

where

R is hydrogen, alkyl of 1 to 4 carbon atoms, such as methyl, cyano, carboxyl, carbalkoxy of 2 to 5 carbon atoms, such as carbomethoxy or carboethoxy, carbamoyl or phenyl, preferably methyl, carboxyl, carbomethoxy or carboethoxy, Q is a benzene or naphthalene radical, $R^2$ is hydrogen, alkyl of 1 to 4 carbon atoms, such as ethyl or in particular methyl, alkoxy of 1 to 4 carbon atoms, such as ethoxy or in particular methoxy, fluorine, bromine, chlorine, sulfo, carboxyl, carbalkoxy of 2 to 5 carbon atoms, such as carbomethoxy or carboethoxy, trifluoromethyl, carbamoyl or N-($C_1$-$C_4$-alkyl)-carbamoyl, preferably hydrogen, methoxy or methyl, if Q is a benzene ring, or is hydrogen or sulfo if Q is a naphthalene ring, '$R^3$ is hydrogen, alkyl of 1 to 4 carbon atoms, such as ethyl or in particular methyl, alkoxy of 1 to 4 carbon atoms, such as ethoxy or in particular methoxy, chlorine or sulfo, preferably hydrogen, methoxy, ethoxy or methyl, if Q is a benzene radical, or is hydrogen or sulfo if Q is a naphthalene radical, $R^4$ is hydrogen, alkyl of 1 to 4 carbon atoms, such as ethyl or in particular methyl, alkoxy of 1 to 4 carbon atoms, such as ethoxy or in particular methoxy, bromine, chlorine, trifluoromethyl, sulfo, carboxyl or cyano, preferably hydrogen, methyl or sulfo, $R^5$ is hydrogen, alkyl of 1 to 4 carbon atoms, such as ethyl or in particular methyl, alkoxy of 1 to 4 carbon atoms, such as ethoxy or in particular methoxy, chlorine, amino, alkylamino of 1 to 4 carbon atoms, such as ethylamino, alkanoylamino of 2 to 5 carbon atoms, such as acetylamino or propionylamino, benzoylamino, ureido, N'-phenylureido, N'-($C_1$-$C_4$-alkyl)-ureido, phenylsulfonyl or alkylsulfonyl of 1 to 4 carbon atoms, such as ethylsulfonyl or methylsulfonyl, preferably ureido, acetylamino or propionylamino, $R^6$ is hydrogen or sulfo, M is as defined above, m is 1 or 2, v is zero or 1, and -K-N($R^0$)- is the bivalent radical of a water-soluble amino-containing coupling component, such as, for example, a radical of the formula (6a), (6b) (6c), (6d), (6e), (6f), (6g), (6h) or (6i)

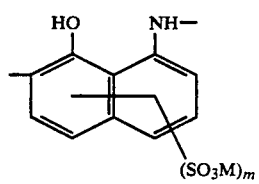 (6a)

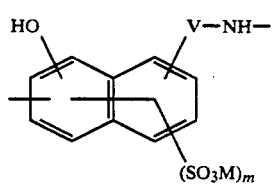 (6b)

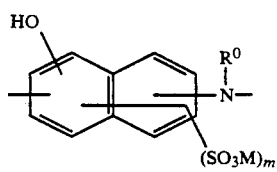 (6c)

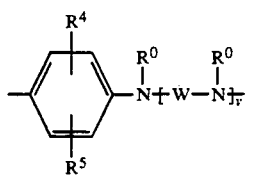 (6d)

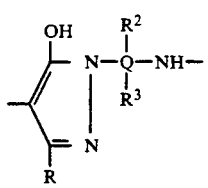 (6e)

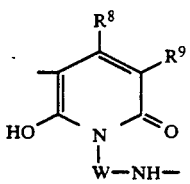 (6f)

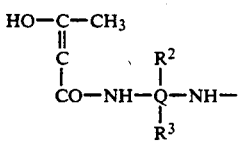 (6g)

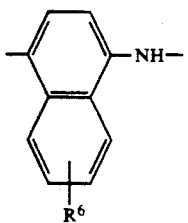 (6h)

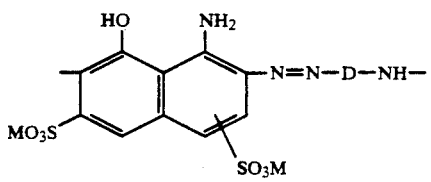 (6i)

where

M, m, v, Q, D, R, R⁰, R¹, R², R³, R⁴, R⁵ and R⁶ are each as defined above,

V is a direct, covalent bond or a radical of the formula -NH-CO-phenylene-, -NH-CO-NH-phenylene-, -N(CH$_3$)-CO-phenylene-,-N(CH$_3$)-CO-NH-phenylene-or -NH-phenylene-, W is a phenylene radical which may be substituted by 1 or 2 substituents selected from the group consisting of alkyl of 1 to 4 carbon atoms, such as ethyl or in particular methyl, alkoxy of 1 to 4 carbon atoms, such as ethoxy or in particular methoxy, chlorine, carboxyl and sulfo, or alkylene of 1 to 6 carbon atoms, preferably of 1 to 4 carbon atoms, such as, for example, ethylene, or alkylene-phenylene having an alkylene moiety of 2 to 4 carbon atoms, such as, for example, methylene-phenylene or ethylene-phenylene, R$^8$ is hydrogen, alkyl of 1 to 4 carbon atoms, such as methyl, alkoxy of 1 to 4 carbon atoms, such as methoxy, phenyl or cyano-substituted alkyl of 1 to 4 carbon atoms, and R$^9$ is hydrogen, sulfo, sulfoalkyl of 1 to 4 carbon atoms, such as sulfomethyl, cyano or carbamoyl.

E is to be understood as the radical of a couplable and diazotizable compound conforming to formula H-E-NH$_2$.

Alkali-eliminable substituents for ethyl Y are for example halogen atoms, such as bromine and chlorine, ester groups of organic carboxylic and sulfonic acids, such as alkanoyloxy of 2 to 5 carbon atoms, for example acetyloxy, or sulfobenzoyloxy, benzoyloxy, phenylsulfonyloxy or toluylsulfonyloxy, also for example the acid ester groups of phosphoric acid, of sulfuric acid and of thiosulfuric acid (phosphato, sulfato and thiosulfato groups respectively), and also dialkylamino groups having alkyl groups each of 1 to 4 carbon atoms, such as dimethylamino and diethylamino. Preferably, Y is vinyl or in particular β-sulfatoethyl.

The terms "sulfo", "carboxyl", "thiosulfato", "phosphato" and "sulfato" as used hereinbefore and hereinafter are meant to imply not only the acid form but also the salt form of these groups. Accordingly, sulfo denotes groups conforming to the formula —SO$_3$M, carboxyl denotes groups conforming to the formula —COOM, thiosulfato denotes groups conforming to the formula —S—SO$_3$M, phosphato denotes groups conforming to the formula —OPO$_3$M$_2$ and sulfato denotes groups conforming to the formula —OSO$_3$M, in each case with M of the abovementioned definition.

In the formulae (5b), (6b) and (6c), the hydroxyl group and the free bond are in each case ortho to each other within the same aromatic nucleus Preferably, the hydroxyl group is bonded to the naphthalene radical in the α-position.

Preferably, B is a phenylene radical in which case a is preferably zero and k is 1 and the —SO$_2$—Y group is preferably bonded to the phenylene radical meta or para to the —NH—A— group. Furthermore, preferably R* is hydrogen, methoxy or sulfo, and also preferably R" is hydrogen, methyl or methoxy.

Preference is further given to compounds of the formula (1) in which G is chlorine or fluorine. Preference is also given to compounds of the formula (1) in which A is a direct bond.

Fiber-reactive groupings Z conforming to the formula (3) are for example the 4-chloro-6-[β-(4'-β'-sulfatoethylsulfonylphenyl)ethyl]amino-1,3,5-triazin-2-ylamino, 4-chloro-6-(4'-β-sulfatoethylsulfonylphenyl)amino-1,3,5-triazin-2-ylamino, 4-fluoro-6-(3'-β-sulfatoethylsulfonylphenyl)amino-1,3,5-triazin-2-ylamino, 4-fluoro-6-(4'-β-sulfatoethylsulfonylphenyl)amino-1,3,5-triazin-2-ylamino, 4-chloro-6-(3'-β-sulfatoethylsulfonylphenyl)amino-1,3,5-triazin-2-ylamino, 4-chloro-6-[2'-sulfo-5'-(β-sulfatoethylsulfonyl)phenyl]amino-1,3,5-triazin-2-ylamino and 4-fluoro-6-[β-(4'-β'-sulfatoethylsulfonylphenyl)ethyl]-amino-1,3,5-triazin-2-ylamino radicals and also other radicals evident from the Examples.

Preferred azo compounds of the formula (1) where K⁰ has the formula (2A) are in particular those in which K⁰ is a radical of the formula (7a), (7b), (7c), (7d), (7e) or (7f)

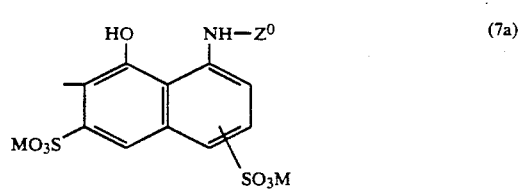 (7a)

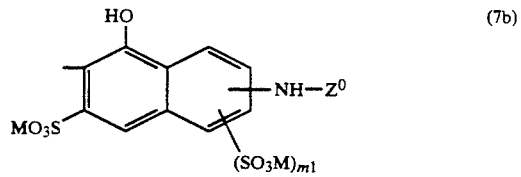 (7b)

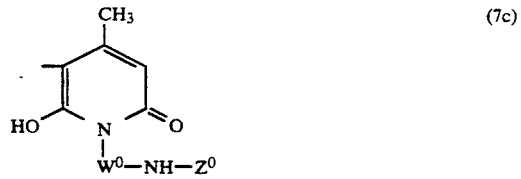 (7c)

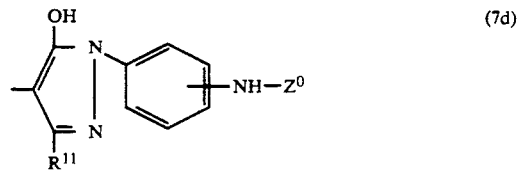 (7d)

-continued

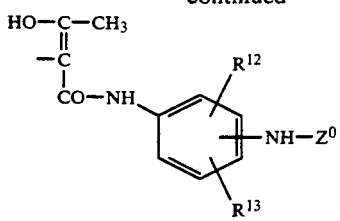
(7e)

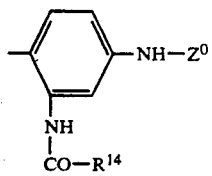
(7f)

or especially of the formula (7a) or (7b), where
M is as defined above,
$Z^o$ is a radical of the formula (3A)

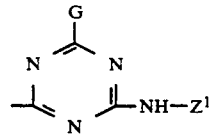
(3A)

where G and $Z^1$ each have the above, in particular the preferred, meanings,
$m_1$ is zero or 1 (if zero, this group being hydrogen),
$W^o$ is alkylene of 2 to 4 carbon atoms or phenylene,
$R^{11}$ is carboxyl, methyl or carboethoxy,
$R^{12}$ is hydrogen, methyl, methoxy, sulfo or chlorine,
$R^{13}$ is hydrogen, methyl or methoxy, and
$R^{14}$ is methyl or amino,
and particular preference is also given to compounds conforming to the formulae (1A), (1B), (1C), (1D) and (1E)

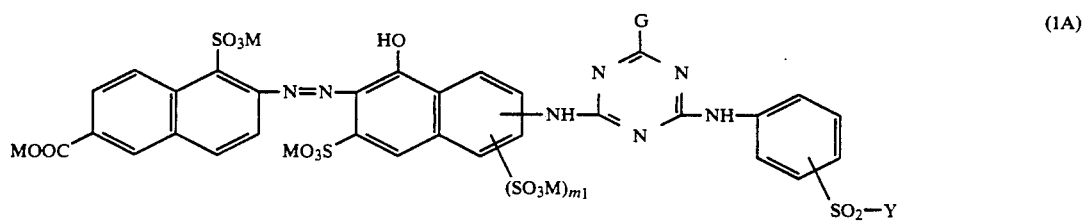
(1A)

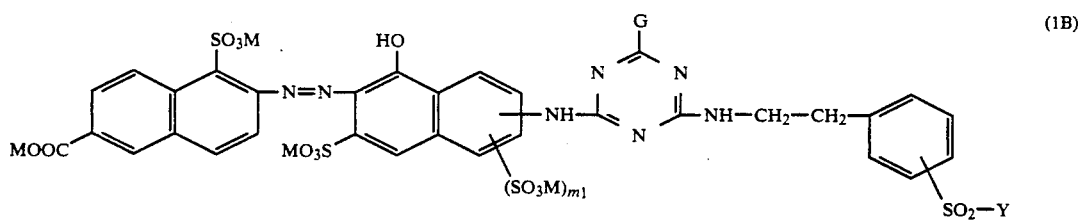
(1B)

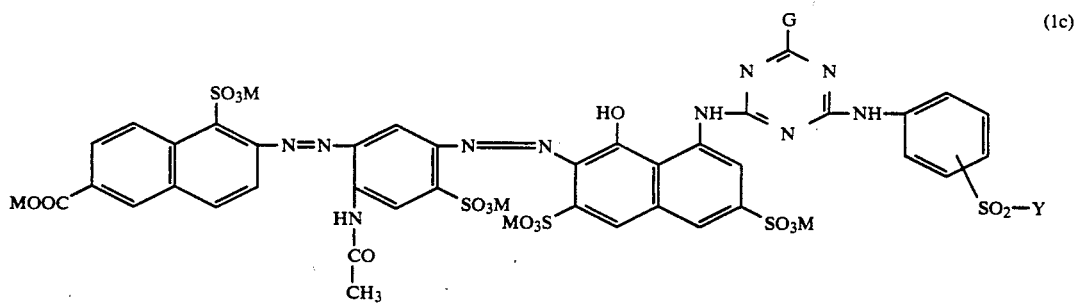
(1c)

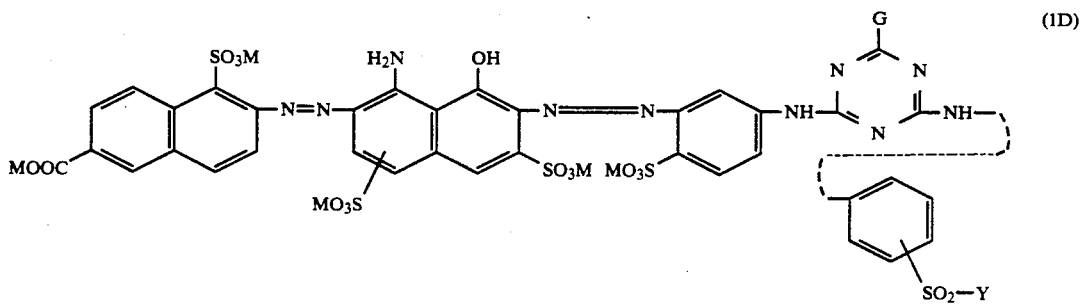
(1D)

-continued

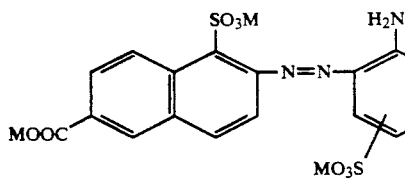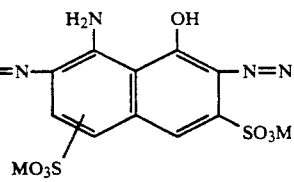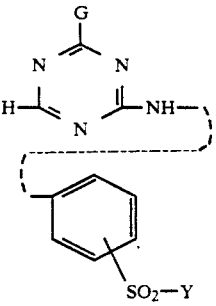

(1E)

where D, Y and M have one of the abovementioned, particularly preferred meanings, m: is zero or 1 and G is chlorine or fluorine.

$K^o$ of the formula (2A) is for example 1-[4'-chloro-6'-(4''-β-sulfatoethylsulfonylphenyl)amino-s-triazin-2'-yl]amino-8-hydroxy-3,6- or -4,6-disulfonaphth-7-yl, 2-[4'-chloro-6'-(4''-β-sulfatoethylsulfonylphenyl)amino-s-triazin-2'-yl]amino-8-hydroxy-6-sulfonaphth-7-yl, 3-[4'-chloro-6'-(4''-β-sulfatoethylsulfonylphenyl)amino-s-triazin-2'-yl]amino-8-hydroxy-6-sulfonaphth-7-yl, 1-[4'-fluoro-6'-(4''-β-sulfatoethylsulfonylphenyl)amino-s-triazin-2'-yl]amino-8-hydroxy-3,6- or -4,6-disulfonaphth-7-yl, 2-[4'-fluoro-6'-(4''-β-sulfatoethylsulfonylphenyl)amino-s-triazin-2'-yl]amino-8-hydroxy-6-sulfonaphth-7-yl, 3-[4'-fluoro-6'-(4''-β-sulfatoethylsulfonylphenyl)amino-s-triazin-2'-yl]amino-8-hydroxy-6-sulfonaphth-7-yl, 1-{4'-chloro-6'-[β-(4''-β'''-sulfatoethylsulfonylphenyl)-ethylamino]-s-traizin-2'-yl}amino-8-hydroxy-3,6-or-4,6-disulfonaphth-7-yl, 1-[4'-chloro-6'-(3''-β-sulfatoethylsulfonylphenyl)amino-s-triazin-2'-yl]amino-8-hydroxy-3,6-or-4,6-disulfonaphth-7-yl, 1-[4'-chloro-6'-(2''-sulfo-4''-β-sulfatoethylsulfonylphenyl)amino-s-triazin-2'-yl]amino-8-hydroxy-3,6-disulfonaphth-7-yl, 1-{4'-chloro-6'-[β-(2''-sulfo-4''-β'''-sulfatoethylsulfonylphenyl)ethyl]amino-s-triazin-2'-yl}amino-8-hydroxy-3,6-disulfonaphth-7-yl, 1-{4'-fluoro-6'-[β-(3'''-β''-sulfatoethylsulfonylphenyl)ethyl]amino-s-triazin-2'-yl}amino-8-hydroxy-3,6-di-sulfonaphth-7-yl, 1-{4'-chloro-6'-[γ-(β'-sulfatoethylsulfonyl)propyl]amino-s-triazin-2'-yl}amino-8-hydroxy-3,6-disulfonaphth-7-yl-, 1-[4'-chloro-6'-(2''-sulfo-5''-β-sulfatoethylsulfonylphenyl)amino-s-triazin-2'-yl]amino-8-hydroxy-3,6-disulfonaphth-7-yl, 1-[4'-methoxy-6'-(4''-β-sulfatoethylsulfonylphenyl)amino-s-triazin-2'-yl]amino-8-hydroxy-3,6-disulfonaphth-7-yl, 1-[4'-chloro-6'-(4''-vinylsulfonylphenyl)amino-s-triazin-2'-yl]amino-8-hydroxy-3,6-disulfonaphth-7-yl, 1-[4'-chloro-6'-(4''-β-sulfatoethylsulfonylphenyl)amino-s-triazin-2'-yl]amino-4-sulfo-8-hydroxynaphth-7-yl, 1-[4'-chloro-6'-(3''-β-sulfatoethylsulfonylphenyl)amino-s-triazin-2'-yl]amino-4-sulfo-8-hydroxynaphth-7-yl, 1-{4'-chloro-6'-[β-(4''-β'''-sulfatoethylsulfonylphenyl)ethyl]amino-s-triazin-2'-yl}-amino-3-acetylaminophenyl, 1-[4'-chloro-6'-(4''-β-sulfatoethylsulfonylphenyl)amino-s-triazin-2'-yl]amino-3-acetylaminophenyl, 1-[4'chloro-6'-(4''-β-sulfatoethylsulfonylphenyl)amino-s-triazin-2'-yl]amino-3-propionylaminophenyl, 1-[4'-chloro-6'-(4''-β-sulfatoethylsulfonylphenyl)amino-s-triazin-2'-yl]amino-3-ureidophenyl, 1-[4'-fluoro-6'-(3''-β-sulfatoethylsulfonylphenyl)amino-s-triazin-2'-yl]amino-3-ureidophenyl, 1-[4'-fluoro-6'-(4''-β-sulfatoethylsulfonylphenyl)amino-s-triazin-2'-yl]amino-3-ureidophenyl, 1-[4'-chloro-6'-(3''-β-sulfatoethyl-sulfonylphenyl)amino-s-triazin-2'-yl]amino-3-ureidophenyl, 1-[4'-chloro-6'-(2''-sulfo-5''-β-sulfatoethylsulfonylphenyl)amino-s-triazin-2'-yl]amino-3-(N'-phenylureido)phenyl, 1-{4'-fluoro-6'-[γ-(β'-sulfatoethylsulfonyl)propyl]amino-s-triazin-2'-yl}amino-3-(N'-methylureido)phenyl, 1-[4'-fluoro-6'-(4''-β-sulfatoethylsulfonylphenyl)amino-s-triazin-2'-yl]amino-3-acetylaminophenyl, 1-[4'-fluoro-6'-(4''-β-sulfatoethylsulfonylphenyl)amino-s-triazin-2'-yl]amino-3-methylphenyl, 1-[4'-fluoro-6'-(2''-sulfo-4''-β-sulfatoethylsulfonylphenyl)-amino-s-triazin-2'-yl]amino-3-acetylaminophenyl and 1-[4'-fluoro-6'-(4''-β-sulfatoethylsulfonylphenyl)amino-s-triazin-2'-yl]amino-3-ureidophenyl.

The present invention also provides processes for preparing the azo compounds of the formula (1) according to the present invention, which comprise if $K^o$ is a radical of the formula (2A) coupling of the diazonium compound of an amine of the formula (8)

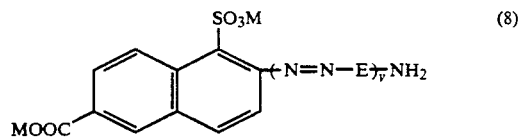

(8)

where M, E and v are each as defined above, with a compound of the formula H—K—N($R^o$)—Z, where K, $R^o$ and Z are each as defined above, or reacting a compound of the formula (9)

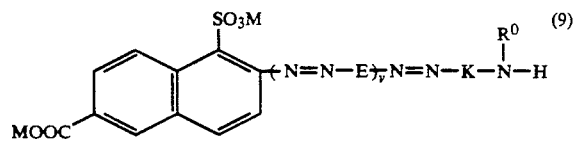

(9)

where M, E, v, $R^o$ and K are each as defined above, with a compound of the formula Hal-Z, where Z is as defined above and Hal is halogen, such as chlorine or fluorine, or condensing a compound of the formula (10)

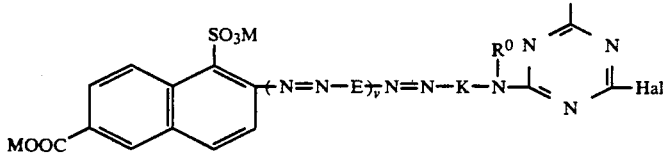

(10)

where Hal, M, E, v, $R^o$, K and G are each as defined above, with a compound of the formula (11a) or (11b)

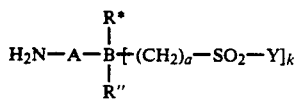

(11a)

$H_2N—alk—SO_2—Y$ (11b)

where A, B, R*, R", a, k, Y and alk are each as defined above, or if K° is a radical of the formula (2B) coupling a compound of the formula (12)

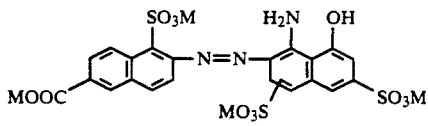

(12)

where M is as defined above, with the diazonium compound of an amine of the formula (13)

$H_2N—D—N(R^o)—Z$ (13)

where D, $R^o$ and Z are each as defined above, or reacting a compound of the formula (14)

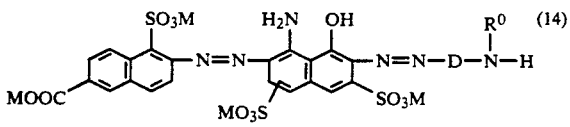

(14)

where D, $R^o$ and M are each as defined above, with a compound of the formula Hal-Z, where Hal and Z are each as defined above, or condensing a compound of the formula (15)

case of an amino-containing coupling component, and at a pH between 3 and 7.5 in the case of a hydroxyl-containing coupling component, preferably in an aqueous medium.

The starting compounds of the formula (8) where v is 1 are prepared from the 1-sulfo-6-carboxy-2-aminonaphthalene as diazo component and from the compound of the general formula $H-E-NH_2$ as coupling component in the known manner of diazotization and coupling reactions. The azo compounds of the formula (12) are synthesized in the same way by coupling the diazonium salt of 1-sulfo-6-carboxy-2-aminonaphthalene with 1-amino-8-naphthol-3,6- or -4,6-disulfonic acid in a strongly acid medium in a conventional manner.

The starting compounds conforming to the formula $H—E—NH_2$ and to the formulae (11a) and (11b) are known and have been repeatedly described in the literature.

Starting compounds of the formula $H—E—NH_2$ are for example aniline, 3-methylaniline, 3-chloroaniline, 2,5-dimethylaniline, 2,5-dimethoxyaniline, 3-methoxyaniline, 3-methyl-6-methoxyaniline, 3-ureidoaniline, 3-acetyl-amino-6-methylaniline, 2-amino-4-acetylaminobenzene-1sulfonic acid, 1-aminonaphthalene, 1-aminonaphthalene-6- or -7- or -8-sulfonic acid, 3-acetylaminoaniline, 2-methylaniline,2-methoxyaniline,3-benzoylaminoaniline, 2,3-dimethylaniline, 3,5-dimethylaniline, 2-methoxy-5-acetylaminoaniline, 2-chloro-6-methylaniline, 5-chloro-2-methylaniline, 2,6-dichloro-3-methylaniline and 2-methoxy-5-methylaniline.

Starting compounds of the formula $H—K—N(-R^o)—H$ are for example 1-(3'- or 4'-aminophenyl)-3-carboxy-5-pyrazolone, 1-(2'-sulfo-5'-aminophenyl)-3-carboxy-5-pyrazolone, 1-(2'-methoxy-5'-aminophenyl)-3-carboxy-5-pyrazolone, 1-(3'- or 4'-aminophenyl)-3-methyl-5-pyrazolone, 1-(6'-amino-4',8'-disulfonaphth-

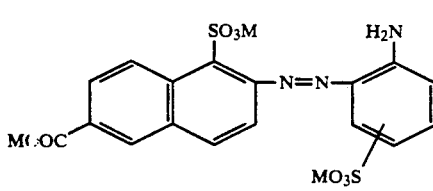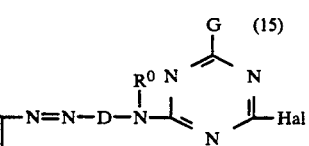

(15)

where G, D, $R^o$ and M are each as defined above, with a compound of formula (11a) or (11b).

The diazotization and coupling reactions of the process according to the present invention are carried out in a conventional manner, for instance the diazotization in general at a temperature between $-5°$ C. and $+15°$ C. and at a pH below 2 by means of a strong acid and an alkali metal nitrite in a preferably aqueous medium and the coupling reaction in general at a temperature between 0° and 30° C. and at a pH between 1 and 4.5 in the 2'-yl)-3-carboxy-5-pyrazolone, 1-amino-3,6- or -4,6-disulfo-8-naphthol, 7-amino-3-sulfo-1-naphthol, 6-amino-3-sulfo-1-naphthol, 6-amino-3,5-disulfo-1-naphthol, 3-methylaniline, 3-chloroaniline, 2,5-dimethylaniline, 2,5-dimethoxyaniline, aniline, 3-methoxyaniline, 3-methyl-6-methoxyaniline, 3-ureidoaniline,3-acetylamino-6-methylaniline,2-amino-4-acetylaminobenzene-1-sulfonic acid, 1-aminonaphthalene, 1-aminonaphthalene-6- or -7- or -8-sulfonic acid, 3-acetylaminoaniline, 2-methylaniline, 2-methoxyaniline, 3-benzoylaminoaniline,2,3-dimethylaniline,3,5-dimethylaniline, 2-methoxy-5-acetylaminoaniline, 2-chloro-6-methylaniline, 5-chloro-2-methylaniline, 2,6-dichloro-3-methylaniline, 2-methoxy-5-methylaniline, 4-(phenylazo)-aniline, 3-propionylaminoaniline, 3-butyrylaminoaniline, 2-sulfo-5-acetylaminoaniline, 2-amino-5-naphthol-7-sulfonic acid, 2-amino-8-naphthol-6-sulfonic acid, 6-methylamino-3-sulfo-1-naphthol, 1-amino-3,6- or -4,6-disulfo-8-naphthol, 6-amino-3,5-disulfo-1-naphthol, 6-(4'-aminophenyl)amino-3-sulfo-1-naphthol, 1-amino-2,4-disulfo-8-naphthol, 1-(4'-aminobenzoylamino)-3,6-disulfo-8-naphthol, 1-(3'-aminobenzoylamino)-3,6-disulfo-8-naphthol, 1-(4'-amino-2'-sulfophenyl)-3-carboxy-5-pyrazolone, 1-(4'-amino-2'-sulfophenyl)-3-methyl-5-pyrazolone, 1-(3'-sulfo-6'-methyl-5'-aminophenyl)-3-carboxy-5-pyrazolone, 1-{4'-[N'-(4''-sulfo-3''-aminophenyl)carbamoyl]phenyl}-3-methyl- or -3-carboxy-5-pyrazolone, N(3,5-disulfo-4-amino)acetoacetylanilide, N-(3-sulfo-4-amino-6-methoxy)acetoacetylanilide, 2-hydroxy-5-carbamoyl-4-methyl-1-(β-aminoethyl)-6-pyridone and 2-hydroxy-5-sulfomethyl-4-methyl-1-(β-aminoethyl)-6-pyridone.

Starting compounds of the formulae (11a) and (11b) are for example 2-(β-sulfatoethylsulfonyl)aniline, 3-(β-sulfatoethylsulfonyl)aniline, 4-(β-sulfatoethylsulfonyl)aniline, 2-carboxy-5-(β-sulfatoethylsulfonyl)aniline, 2-chloro-3-(β-sulfatoethylsulfonyl)aniline, 2-chloro-4-(β-sulfatoethylsulfonyl)aniline, 2-ethoxy-4- or -5-(β-sulfatoethylsulfonyl)aniline, 2-ethyl-4-(β-sulfatoethylsulfonyl)aniline, 2-methoxy-5-(β-sulfatoethylsulfonyl)aniline, 2,4-diethoxy-5-(β-sulfatoethylsulfonyl)aniline, 2,4-dimethoxy-5-(β-sulfatoethylsulfonyl)aniline, 2,5-dimethoxy-4-(β-sulfatoethylsulfonyl)aniline, 2-methoxy-5-methyl-4-(β-sulfatoethylsulfonyl)aniline, 2- or 3- or 4-(β-thiosulfatoethylsulfonyl)aniline, 2-methoxy-5-(β-thiosulfatoethylsulfonyl)aniline, 2-sulfo-4-(β-phosphatoethylsulfonyl)aniline, 2-sulfo-4-vinylsulfonylaniline, 2-hydroxy-4- or -5-(β-sulfatoethylsulfonyl)aniline, 2-chloro-4- or -5-(β-chloroethylsulfonyl)aniline, 2-hydroxy-3-sulfo-5-(β-sulfatoethylsulfonyl)aniline, 3- or 4-(β-acetoxyethylsulfonyl)aniline, 2-methoxy-4-[β-(N-methyltauryl)ethylsulfonyl]aniline, 5-(β-sulfatoethylsulfonyl)-2-aminonaphthalene, 6- or 7- or 8-(β-sulfatoethylsulfonyl)-2-aminonaphthalene, 6-(β-sulfatoethylsulfonyl)-1-sulfo-2-aminonaphthalene, 5-(β-sulfatoethylsulfonyl)-1-sulfo-2-aminonaphthalene, 8-(β-sulfatoethylsulfonyl)-6-sulfo-2-aminonaphthalene and also γ-(β'-sulfatoethylsulfonyl)propylamine and γ-(β'-chloroethylsulfonyl)propylamine.

The condensation reaction between an amino starting compound of the formula (9) or (14) and a compound of the formula Hal-Z is carried out in the usual manner of reacting an amino compound with a triazine compound which contains a reactive halogen atom, for instance in an organic or preferably aqueous-organic medium, particularly preferably in an aqueous medium, in the presence of an acid-binding agent, such as an alkali metal or alkaline-earth metal carbonate, alkali metal or alkaline-earth metal bicarbonate or hydroxide or an alkali metal acetate, the alkali and alkaline-earth metals preferably being sodium, potassium or calcium or a tertiary amine, such as, for example, pyridine, triethylamine and quinoline. If these condensation reactions are carried out in an organic or aqueous-organic medium, the organic solvent (component) is acetone, dioxane or dimethylformamide.

The condensation reactions between these amino compounds and the Hal-Z compound are in general carried out at a temperature between −10° C. and +60° C., preferably between 30° and 45° C., and at a pH between 2 and 7, preferably between 2 and 4. The reaction with a compound Hal-Z where Hal is fluorine is carried out particularly preferably at a pH between 3 and 5 and at a temperature between 0° C. and 30° C. The reaction with Hal-Z where Hal is chlorine, in particular the reaction with a compound of the formula (16)

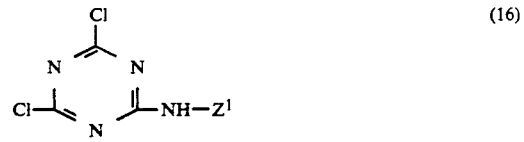

where $Z^1$ is as defined above, is carried out particularly preferably at a pH between 2.0 and 4.5 and at a temperature between 30° and 45° C.

The condensation reaction between a halotriazinylamino compound of the formula (10) or (15) and an amino compound conforming to the formulae (11) is similarly carried out in the known manner of reacting such halotriazinylamino compounds with amines, including for instance in the above-specified reaction media in the presence of an acid-binding agent. In general, the reaction is carried out at a temperature between 40° and 100° C., preferably between 50° and 70° C., the particularly preferred conditions for the reaction with starting compounds in which Hal is chlorine being a temperature between 50° and 70° C. and a pH between 2 and 4.

The 1-sulfo-6-carboxy-2-aminonaphthalene starting compound has not been disclosed before. It can be prepared according to the present invention by first sulfonating 2-naphthol-6-carboxylic acid in a sulfuric acid/sulfur trioxide mixture (oleum) having a sulfur trioxide content of 0 to 65% by weight at a temperature between 0° C. and 40° C., preferably at 0° to 10° C., to 1-sulfo-6-carboxy-2-naphthol, isolating this compound and then reacting it at a temperature between 100° and 160° C. in an autoclave in aqueous medium with ammonium hydrogen-sulfite. The 1-sulfo-6-carboxy-2-naphthol is isolated from the reaction mixture in a conventional manner by carefully pouring the reaction batch onto ice. The precipitated product is filtered off with suction and suspended in ice-water, and any sulfuric acid still present is neutralized with sodium carbonate by adjusting the suspension to a pH between 4 and 4.5. The compound can then be isolated by filtering off with suction and drying.

The exchange of the hydroxyl group for an amino group is effected similarly to a Bucherer reaction. The general procedure is to dissolve the 1-sulfo-6-carboxy-2-naphthol in a 20-30% strength by weight aqueous ammonium hydrogen sulfite solution and to react the reaction mixture in an autoclave under the abovementioned conditions. After this reaction has ended, the batch is adjusted at room temperature with hydrochloric acid to pH 1. The mixture is subsequently stirred for about an hour, in the course of which the sulfocarboxyaminonaphthalene compound according to the present invention precipitates as an inner salt, which can be isolated.

The compounds of the formula (1) according to the present invention—hereinafter referred to as compounds (1)—have fiber-reactive properties and very useful dye properties. They can therefore be used for dyeing (including printing) hydroxyl-containing and/or carboxamidocontaining materials. In fact, the solutions obtained in the synthesis of compounds (1) may directly be used as liquid dyes, with or without addition of a buffer substance and with or without concentrating.

The compounds (1) can be separated and isolated from the aqueous synthesis solutions by commonly known methods for water-soluble compounds, for instance by precipitation from the reaction medium with an electrolyte, for example sodium chloride or potassium chloride, or else by evaporation of the reaction solution itself, for example by spray drying.

If the latter method of isolation is chosen, it is advisable in many cases to remove any sulfate quantities present in the solutions prior to evaporation, by precipitation as calcium sulfate and separation by filtration.

The present invention accordingly also provides for the use of the compounds (1) for the dyeing (including printing) of hydroxyl- and/or carboxamido-containing materials and a process for their application to these substrates. The materials to which they are applied are preferably in the form of fiber materials, in particular in the form of textile fibers, such as yarns, packages and fabrics. It is possible for conventional techniques to be employed.

Hydroxyl-containing materials are such materials of natural or synthetic origin, for example cellulose fiber materials, regenerated products thereof and polyvinyl alcohols. Cellulose fiber materials are preferably cotton but other vegetable fibers as well, such as linen, hemp, jute and ramie fibers; regenerated cellulose fibers are for example staple viscose and filament viscose.

Carboxamido-containing materials are for example synthetic and natural polyamides and polyurethanes, in particular in the form of fibers, for example wool and other animal hairs, silk, leather, nylon-6.6, nylon-6, nylon-11 and nylon-4.

The compounds (1), if used according to the present invention, can be employed to and fixed on the substrates mentioned, in particular on the fiber materials mentioned, by the application techniques known for watersoluble fiber-reactive dyes, in a process whereby the compound (1) is applied to or incorporated into the substrate in dissolved form and fixed thereon or therein with the action of heat or with the action of an alkaline agent or with both measures. Such dyeing and fixing techniques have been repeatedly described in the literature (see for example European Patent Application Publication No. 0 181 585 A2). The compounds (1) are notable for high degrees of exhaustion and fixation. Especially in an exhaust technique they produce deep dyeings of a high degree of fixation over a wide temperature range (40° to 80° C).

The dyeings according to the present invention, in particular those on cellulose fiber materials, have good light fastness properties not only in the dry state but also in the wet state, for example when moistened with perspiration solution, and also good wet fastness properties, such as, for example good wash fastness properties at 60° to 95° C., even in the presence of perborates, acid and alkaline milling, cross-dyeing and perspiration fastness properties, good acid and alkaline perspiration fastness properties, a high steam resistance, good acid, water and sea water fastness properties, and also a good fastness to dry heat setting and pleating and a good crock fastness. Similarly, they have an excellent acid fading resistance (when dyed material which is still moist and contains acetic acid is stored).

The Examples which follow illustrate the invention. Parts and percentages are by weight, unless otherwise stated. Parts by weight bear the same relation to parts by volume as the kilogram to the liter.

The compounds described in these Examples by a formula diagram are shown in the form of the free acids; in general, they are prepared and isolated in the form of their alkali metal salts, such as lithium, sodium or potassium salts, and used for dyeing in the form of their salts.

Similarly, the starting compounds and components mentioned in the form of their free acids in the Examples which follow, in particular the table examples, can be used in the synthesis as such or in the form of their salts, preferably alkali metal salts.

The absorption maxima ($\lambda_{max}$) in the visible region reported for the compounds according to the present invention were determined on aqueous solutions of their alkali metal salts. In the table examples, their $\lambda_{max}$ values are given in brackets after the hue; the wavelength unit is nm.

EXAMPLE A a) 283.6 parts of 2-naphthol-6-carboxylic acid are added to 1,200 parts of 100% strength sulfuric acid with stirring and cooling at 5° to 7° C. The mixture is subsequently stirred at 10° C. for about 2 hours and thereafter at 20° C. for a further 2 hours until starting compound is no longer detectable (which can be checked by HPLC analysis). The reaction mixture is then stirred onto 2,700 parts of ice. A precipitate forms, which is filtered off with suction and then suspended in icewater. The suspension is adjusted with sodium carbonate to a pH of between 4 and 4.5, and the product is filtered off with suction, washed with 10% strength aqueous sodium chloride solution and dried at 40° C. under reduced pressure.

b) 269.2 parts of 1-sulfo-6-carboxy-2-naphthol are stirred in 720 parts of an aqueous 25% strength ammonium hydrogen sulfite solution in an autoclave at 150° C. at 12 bar for about 8 hours. Thereafter the reaction mixture is cooled down and adjusted at room temperature to pH 1 with hydrochloric acid. It is subsequently stirred for an hour, and then the precipitated inner salt of the compound according to the present invention is isolated in a yield of about 70% of theory.

The structure of the novel 1-sulfo-6-carboxy-2-aminonaphthalene is confirmed by $^1$H- and $^{13}$C-NMR spectroscopy and by elemental analysis.

1-Sulfo-6-carboxy-2-aminonaphthalene is diazotizable in a conventional manner.

EXAMPLE 1

To a solution of the diazonium salt of 27 parts of 1-sulfo-6-carboxy-2-aminonaphthalene in aqueous hydrochloric acid is added with stirring at 5° C. an aqueous suspension of 31.9 parts of 1-amino-3,6-disulfo-8-naphthol, and the coupling reaction is carried out at a pH between 1 and 2. The suspension of the diazonium salt of the condensation product prepared in aqueous hydrochloric acid by reacting 18.8 parts of 1,3-phenylenediamine-4-sulfonic acid with 18.4 parts of cyanuric chloride at a pH of 2.5 and a temperature of 10° C. is then added. The second coupling reaction is carried out at a pH of between 5 and 6. Then an aqueous solution of 31 parts of 4-($\beta$-sulfatoethylsulfonyl)-1-($\beta$-aminoethyl)benzene is added, and the condensation reaction is completed at a pH between 6.0 and 6.5 and at a temperature of 30° C., and the resulting azo compound according to the present invention is precipitated by adding sodium chloride.

This gives a black electrolyte-containing powder of the alkali metal salt of the compound of the formula

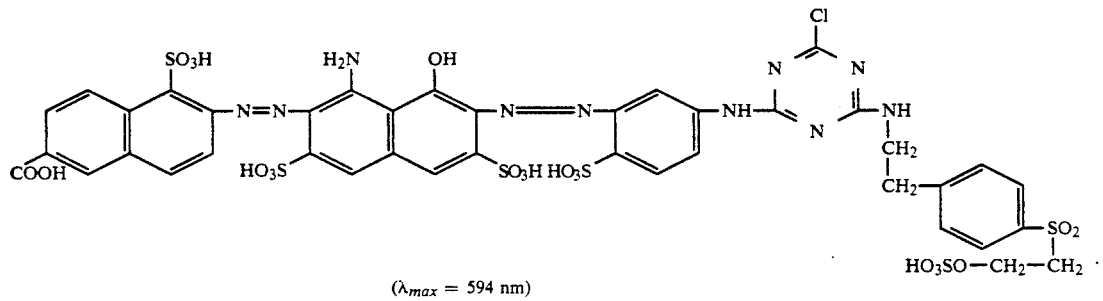

($\lambda_{max}$ = 594 nm)

which possesses very good fiber-reactive dye properties and dyes for example cotton in fast navy shades by the dyeing and printing methods customary for fiber-reactive dyes.

EXAMPLES 2 TO 10

The table examples which follow describe further novel disazo compounds conforming to a formula (A)

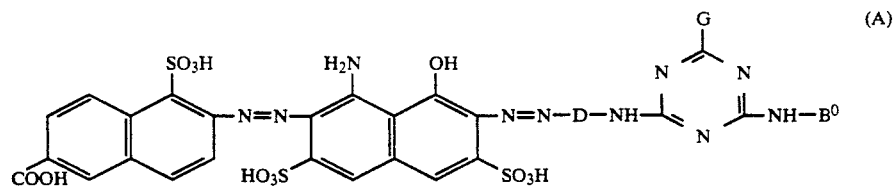

where $B^o$ is the radical of an amino compound conforming to the formula (11a), in terms of the components indicated therein. They can be prepared in a manner according to the present invention, for example in the manner of Embodiment Example 1. These novel disazo compounds likewise have very good fiber-reactive dye properties and dye in particular cellulose fiber materials in the fast deep shade indicated for that table example.

| Example | Disazo compound of the formula (A) | | | Hue |
|---|---|---|---|---|
| | —D— | G | —NH—B° | |
| 2 | ![HO3S-phenyl] | chlorine | 4-(β-sulfatoethylsulfonyl)phenylamino | navy |
| 3 | ![HO3S-phenyl] | chlorine | 4-(β-sulfatoethylsulfonyl)phenylamino | " |
| 4 | " | fluorine | 4-(β-sulfatoethylsulfonyl)phenylamino | " |
| 5 | ![HO3S-phenyl] | fluorine | 4-(β-sulfatoethylsulfonyl)phenylamino | " |
| 6 | " | fluorine | 3-(β-sulfatoethylsulfonyl)phenylamino | " |
| 7 | " | chlorine | 3-(β-sulfatoethylsulfonyl)phenylamino | " |
| 8 | " | fluorine | β-[4-(β'-sulfatoethylsulfonyl)phenyl]ethylamino | " |
| 9 | " | methoxy | 4-(β-sulfatoethylsulfonyl)phenylamino | " |
| 10 | " | chlorine | 2-sulfo-4-(β-sulfatoethylsulfonyl)phenylamino | " |

EXAMPLE 11

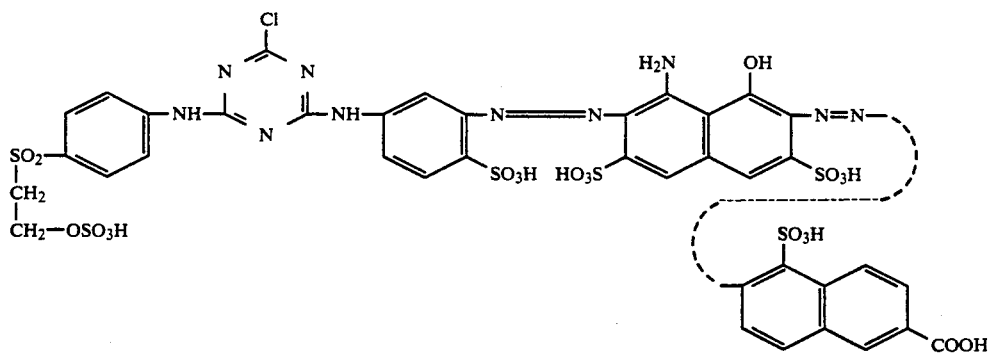

58.2 parts of the binary condensation product of 1,3-phenylenediamine-4-sulfonic acid, cyanuric chloride and 4-(β-sulfatoethylsulfonyl)aniline are diazotized in aqueous hydrochloric acid in a conventional manner and then coupled under acid conditions with a suspension of 30.8 parts of 1-amino-8-naphthol-3,6-disulfonic acid in 300 parts of water. The resulting red monoazo compound is then admixed with 27 parts of 1-sulfo-6-carboxy-2-aminonaphthalene diazotized in aqueous hydrochloric acid, the batch is neutralized, and the coupling reaction to give the disazo dye is completed within the neutral range. The compound according to the present invention is precipitated with potassium chloride. Drying leaves a black electrolyte-containing powder of the alkali metal salt of the compound of the formula which, applied by the dyeing and printing methods customary in industry for fiber-reactive dyes, produces reddish navy dyeings having good fastness properties on cotton for example.

EXAMPLES 12 TO 18

Further novel dyes conforming to a formula (B)

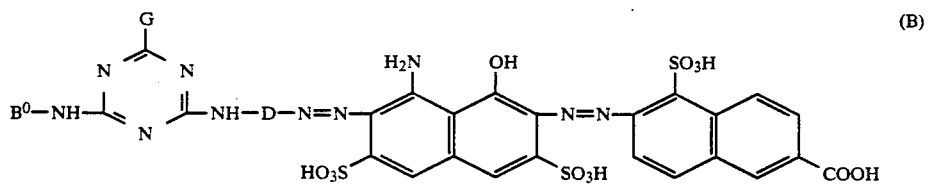

(B)

are described in the table examples which follow in terms of the components indicated therein. They can be prepared in a manner according to the present invention, for example in the manner of Embodiment Example 11, and likewise have very good fiber-reactive dye properties. They dye in particular cellulose fiber materials in the deep hue indicated for that table example.

| Example | Disazo compound of formula (B) | | | Hue |
|---|---|---|---|---|
| | —D— | G | B°—NH— | |
| 12 | [4-sulfophenyl] | fluorine | 4-(β-sulfatoethylsulfonyl)phenylamino | navy |
| 13 | " | methoxy | 4-(β-sulfatoethylsulfonyl)phenylamino | " |
| 14 | " | chlorine | β-[2-sulfo-4-(β-sulfatoethylsulfonyl)phenyl]ethylamino | " |
| 15 | [3-sulfophenyl] | chlorine | 4-(β-sulfatoethylsulfonyl)phenylamino | " |
| 16 | " | fluorine | 4-(β-sulfatoethylsulfonyl)phenylamino | " |
| 17 | " | fluorine | 3-(β-sulfatoethylsulfonyl)phenylamino | " |
| 18 | " | chlorine | 3-(β-sulfatoethylsulfonyl)phenylamino | " |

EXAMPLE 19

27 parts of 1-sulfo-6-carboxy-2-aminonaphthalene are diazotized in the presence of hydrochloric acid and coupled to 15 parts of 3-acetylaminoaniline. This azo compound is acylated with 19 parts of finely divided cyanuric chloride at a temperature of 40° C. and a pH of 4.5, and the monocondensation product is reacted with 31 parts of 4-($\beta$-sulfatoethylsulfonyl)-1-($\beta$-aminoethyl)-benzene. The batch is then neutralized, and the azo compound formed is salted out with sodium chloride and isolated. This gives the alkali metal salt of the compound of the formula

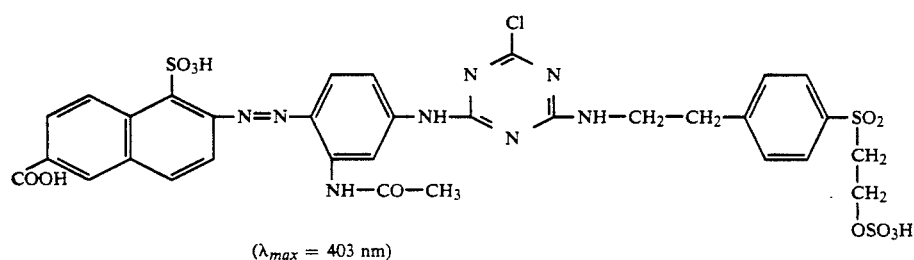

($\lambda_{max}$ = 403 nm)

which, applied in a conventional manner for fiber-reactive dyes, dyes for example cotton in deep fast reddish yellow shades.

EXAMPLES 20 TO 31

Further novel dyes conforming to a formula (C)

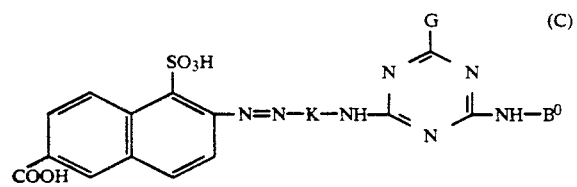

in which —HN—B° is the radical of a starting amine of the formulae (11) and K is the radical of an amino-containing coupling component conforming to the formula H—K—NH$_2$, are described in the table examples which follow in terms of the components indicated therein. They can be prepared in a manner according to the present invention, for example in the manner of Embodiment Example 19, and likewise have very good fiber-reactive dye properties and dye in particular cellulose fiber materials in the fast deep shade indicated for that table example.

| | Azo compound of the formula (C) | | | |
|---|---|---|---|---|
| Ex. | G | coupling component H—K—NH$_2$ | —HN—B° | Hue |
| 20 | chlorine | 3-acetylaminoaniline | 4-($\beta$-sulfatoethyl-sulfonyl)-phenylamino | golden yellow |
| 21 | chlorine | 3-propionylamino-aniline | 4-($\beta$-sulfatoethyl-sulfonyl)-phenylamino | yellow |
| 22 | chlorine | 3-ureidoaniline | 4-($\beta$-sulfatoethyl-sulfonyl)-phenylamino | golden yellow (422) |
| 23 | fluorine | " | 4-($\beta$-sulfatoethyl-sulfonyl)-phenylamino | golden yellow |
| 24 | fluorine | " | 3-($\beta$-sulfatoethyl-sulfonyl)-phenylamino | golden yellow |
| 25 | chlorine | " | 3-($\beta$-sulfatoethyl-sulfonyl)-phenylamino | golden yellow |
| 26 | chlorine | 3-(N'-phenylureido)-aniline | 2-sulfo-5-($\beta$-sulfatoethylsulfonyl)-phenylamino | golden yellow |
| 27 | fluorine | 3-(N'-methylureido)-aniline | $\gamma$-($\beta'$-sulfato-ethylsulfonyl)-propylamine | golden yellow |
| 28 | fluorine | 3-acetylamino-aniline | 4-($\beta$-sulfatoethyl-sulfonyl)-phenylamino | golden yellow |
| 29 | chlorine | 3-methylaniline | 4-($\beta$-sulfatoethyl-sulfonyl)-phenylamino | golden yellow |
| 30 | chlorine | 3-acetylamino-aniline | 2-sulfo-5-($\beta$-sulfatoethylsulfonyl)-phenylamino | golden yellow (449) |
| 31 | fluorine | 3-ureidoaniline | $\beta$-[4-($\beta'$-sulfato-ethylsulfonyl)-phenyl]ethylamino | yellow (402) |

EXAMPLE 32

18.4 parts of cyanuric chloride are reacted in a conventional manner with 31.9 parts of 1-amino-3,6-disulfo-8-naphthol in water to give the monocondensation product, which is then admixed with the solution of the diazonium salt of 1-sulfo-6-carboxy-2-aminonaphthalene in the appropriate equivalent amount; the coupling reaction takes place at a pH between 4 and 4.5. After the coupling reaction has ended, 30.9 parts of 4-($\beta$-sulfatoethylsulfonyl)-1-($\beta$-aminoethyl)benzene are added, and the condensation reaction is carried out at a pH between 5 and 6.5 and at 20° C. The azo compound according to the present invention is isolated from the synthesis solution in a conventional manner. This gives the sodium salt of the compound of the formula

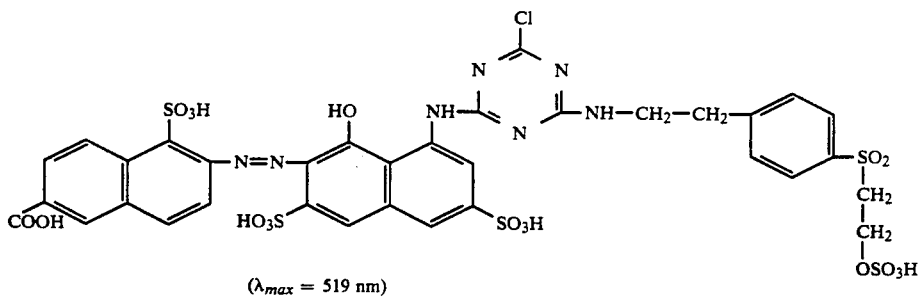

($\lambda_{max}$ = 519 nm)

which dyes for example cotton in bright red shades of very high brilliance.

EXAMPLE 33

31.9 parts of 1-amino-3,6-disulfo-8-naphthol are condensed with 18.5 parts of cyanuric chloride in 50 parts of water and 200 parts of ice at a pH of 2.5 and a temperature of 10° C. Then this synthesis solution is admixed with a solution at pH 4.5 with 28.2 parts of 4-($\beta$-sulfatoethylsulfonyl)aniline in 200 parts water, and the second condensation reaction is carried out at pH 5. Then the resulting solution of the coupling component is admixed with a conventionally prepared (hydrochloric acid, sodium nitrite) solution of the diazonium salt of 27 parts of 1-sulfo-6-carboxy-2-aminonaphthalene in about 450 parts of water, a pH of 5 to 6 is set, and the coupling reaction is carried out within this pH range at a temperature of about 20° C.

The azo compound according to the present invention is salted out with sodium chloride and isolated. Written in the form of the free acid it has the formula

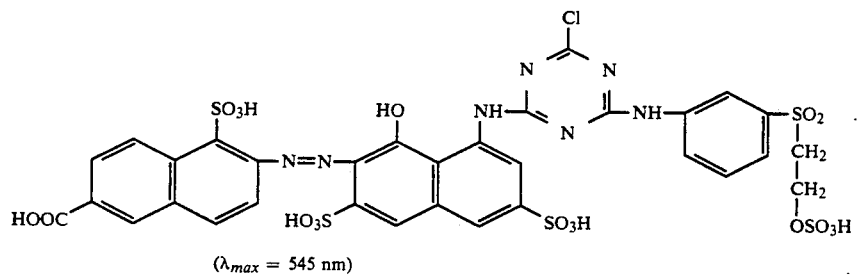

($\lambda_{max}$ = 545 nm)

and possesses very good fiber-reactive dye properties. Applied by the application processes customary in the art of fiber-reactive dyes, it produces strong dyeings and prints in fast bluish red shades of high brilliance.

EXAMPLE 34

First 55.5 parts of cyanuric chloride are reacted in the conventional manner with 96 parts of 1-amino-3,6-disulfo-8-naphthol, and then the resulting monocondensation product is reacted with 84.3 parts of 3-($\beta$-sulfatoethylsulfonyl)aniline to give the dicondensation product. The aqueous synthesis solution of this dicondensation product is admixed with the aqueous hydrochloric acid solution (about 680 parts) of the diazonium salt of 81 parts of 1-sulfo-6-carboxy-2-aminonaphthalene, a pH between 4 and 5 is set with sodium bicarbonate, and the coupling reaction is carried out within this pH range and at a temperature of 20° C. The azo compound formed is precipitated with sodium chloride and isolated. This gives the sodium salt of the compound of the formula

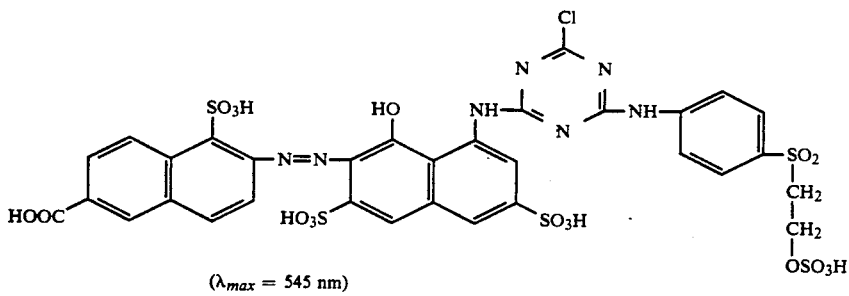

($\lambda_{max}$ = 545 nm)

The azo compound according to the present invention has very good fiber-reactive dye properties. Applied by the application processes for fiber-reactive dyes, it produces strong bluish red dyeings and prints. Both short-time pad-batch dyeings and exhaust dyeings obtained at dyeing temperatures between 40° and 80° C. show an excellent color buildup.

EXAMPLE 35

First 20 parts of cyanuric chloride are reacted in the conventional manner with 30 parts of 4-($\beta$-sulfatoethylsulfonyl)aniline and then the resulting monocondensation product is reacted with 26 parts of 3-amino-8-naphthol-6-sulfonic acid to give the dicondensation product.

The aqueous solution of this condensation product is admixed with the hydrochloric acid diazonium salt solution of 27 parts of 1-sulfo-6-carboxy-2-aminonaphthalene, a pH of 4 to 5 is set, and the coupling reaction is carried out within this pH range and at a temperature of 15° to 20° C.

After the synthesis has ended, the azo compound according to the present invention is precipitated from the synthesis solution with sodium chloride and isolated. This gives the sodium salt of the compound of the formula

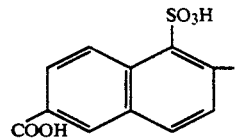
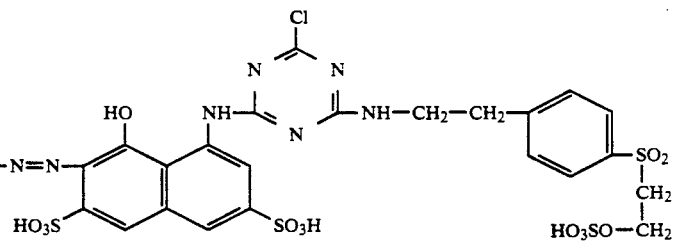

form by salting out to give the alkali metal salt of the compound of the formula which dyes for example cotton by conventional dyeing techniques in very fast reddish violet shades.

EXAMPLES 37 TO 52

Further novel dyes conforming to a formula (D)

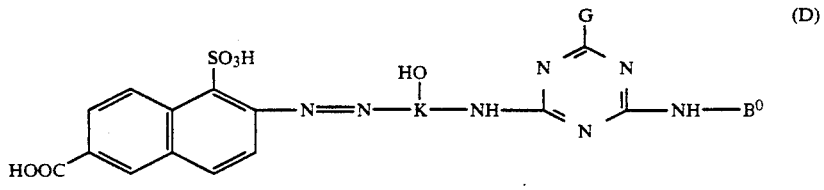

are described in the table examples below in terms of the formula (D) and the symbols indicated therein. They can be prepared in a manner according to the present invention, for example as described in the above embodiment examples, and likewise have very good fiber-reactive dye properties. Applied by the application and fixing methods customary for fiber-reactive dyes, they dye in particular cellulose fiber materials in the deep fast shade indicated for that table example.

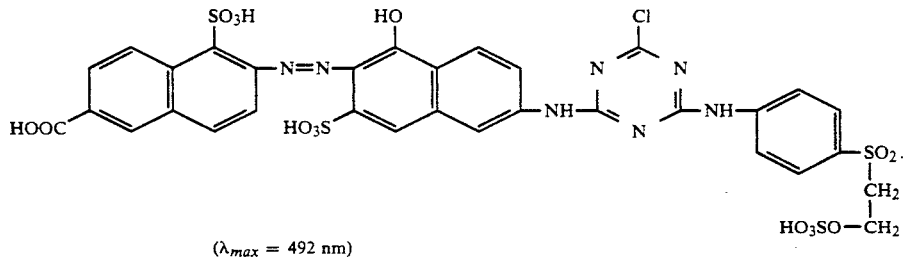

($\lambda_{max}$ = 492 nm)

The compound according to the present invention has very good fiber-reactive dye properties and dyes for example cotton in brilliant reddish orange shades having good fastness properties.

EXAMPLE 36

31.9 parts of 1-amino-3,6-disulfo-8-naphthol are condensed with 18.5 parts of cyanuric chloride at a pH of 2.5 and a temperature of 10° C.

At the same time 27.0 parts of 1-sulfo-6-carboxy-2-aminonaphthalene are diazotized in a conventional manner; this diazonium salt batch is then admixed with a solution of 9.3 parts of aniline in 50 parts by volume of aqueous 0.5 N hydrochloric acid, the coupling reaction is carried out at 20 to 30° C., and the resulting 4-(1'-sulfo-6'-carboxynaphth-2'-yl)azoaniline is diazotized in a conventional manner by addition of 20 parts of aqueous 5 N sodium nitrite solution.

The two reaction batches are combined, and the second coupling reaction is carried out at a pH of 3 to 4. Then 55.8 parts of 4-($\beta$-hydroxyethylsulfonyl)-1-($\beta$-aminoethyl)benzene are added, and the condensation reaction is carried out as described in Example 1. The azo compound is converted into the sulfato form, for example as described in Example 19, and isolated in that

| | | Azo compound of the formula (D) | | |
|---|---|---|---|---|
| Ex. | G | coupling component H—K(OH)—NH$_2$ | —HN—B° | Hue |
| 37 | chlorine | 1-amino-3,6-disulfo-8-naphthol | $\beta$-[2-sulfo-4-($\beta'$-sulfatoethylsulfonyl)phenyl]ethylamino | red |
| 38 | chlorine | 1-amino-3,6-disulfo-8-naphthol | $\gamma$-($\beta'$-sulfatoethylsulfonyl)-propylamino | red |
| 39 | chlorine | 1-amino-3,6-disulfo-8-naphthol | 2-sulfo-(5-$\beta$-sulfatoethylsulfonyl)-phenylamino | red |
| 40 | methoxy | 1-amino-3,6-disulfo-8-naphthol | 4-($\beta$-sulfatoethylsulfonyl)-phenylamino | red |
| 41 | chlorine | 1-amino-4,6-disulfo-8-naphthol | 4-($\beta$-sulfatoethylsulfonyl)-phenylamino | red |

| Ex. | G | Azo compound of the formula (D) coupling component H—K(OH)—NH₂ | —HN—B° | Hue |
|---|---|---|---|---|
| 42 | chlorine | 1-amino-4,6-disulfo-8-naphthol | 3-(β-sulfatoethyl-sulfonyl)-phenylamino | red |
| 43 | chlorine | 1-amino-4-sulfo-8-naphthol | 4-(β-sulfatoethyl-sulfonyl)-phenylamino | scarlet |
| 44 | chlorine | 1-amino-4-sulfo-8-naphthol | 4-(β-sulfatoethyl-sulfonyl)-phenylamino | scarlet |
| 45 | chlorine | 2-amino-6-sulfo-8-naphthol | 4-(β-sulfatoethyl-sulfonyl)-phenylamino | reddish orange (508) |
| 46 | fluorine | 2-amino-6-sulfo-8-naphthol | 4-(β-sulfatoethyl-sulfonyl)-phenylamino | reddish orange (508) |
| 47 | chlorine | 2-amino-7-sulfo-5-naphthol | 4-(β-sulfatoathyl-sulfonyl)-phenylamino | orange |
| 48 | fluorine | 2-amino-7-sulfo-5-naphthol | 4-(β-sulfatoathyl-sulfonyl)-phenylamino | orange |
| 49 | chlorine | 2-amino-6-sulfo-8-naphthol | 3-(β-sulfatoethyl-sulfonyl)-phenylamino | reddish orange (508) |
| 50 | chlorine | 2-amino-6-sulfo-8-naphthol | β-[4-(β'-sulfato-ethylsulfonyl)-phenyl]ethylamino | reddish orange |
| 51 | chlorine | 1-amino-3,6-disulfo-8-naphthol | 4-vinylsulfonyl-phenylamino | red |
| 52 | fluorine | 1-amino-3,6-disulfo-8-naphthol | β-[4-(β'sulfato-ethylsulfonyl)-phenyl]ethylamino | red |

EXAMPLE 53

A solution at pH 6.5 of 43.5 parts of the aminodisazo compound of the formula

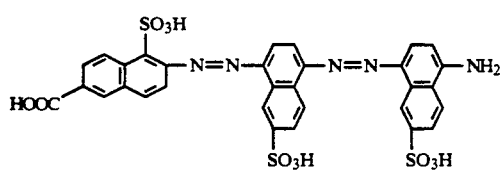

in 300 parts of water is reacted at 0° to 5° C. and a pH of 4.5 with 18.4 parts of cyanuric chloride (the starting aminodisazo compound is obtained in a conventional manner for such disazo compounds by coupling the diazonium salt of 1-sulfo-6-carboxy-2-aminonaphthalene with 7-sulfo-1-aminonaphthalene, diazotizing the resulting aminoazo compound and coupling the diazonium salt with 7-sulfo-1-aminonaphthalene). The reaction product of this amino-disazo compound with cyanuric chloride is then reacted in its synthesis solution with 30.9 parts of 4-(β-sulfatoethylsulfonyl)- 1-(β-aminoethyl)benzene at a temperature of 20° C. and a pH between 5 and 6.5.

The disazo compound according to the present invention is isolated in a conventional manner as an alkali metal salt. Written in the form of the free acid it has the formula

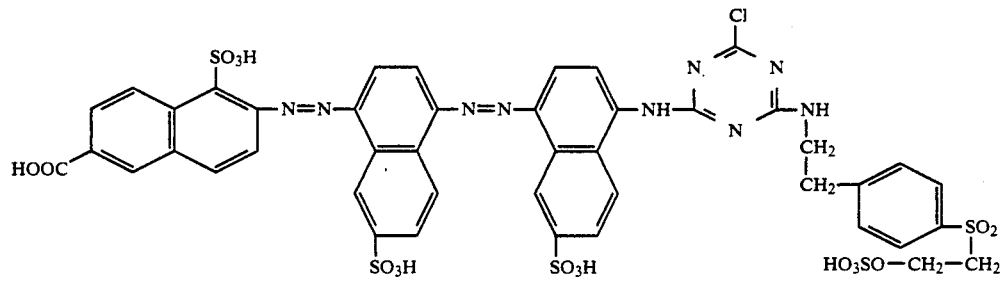

shows very good fiber-reactive dye properties and dyes the materials mentioned in the description, such as in particular cellulose fiber materials, for example cotton, by the application and fixing methods customary in the art in deep fast reddish brown shades.

EXAMPLES 54 TO 58

The table examples which follow describe further novel disazo compounds conforming to the formula (E)

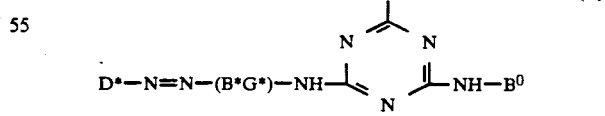

in terms of this formula and the individual elements thereof, D* being 1-sulfo-6-carboxy-2-naphthyl. They can be prepared in a manner according to the present invention, for example as described in Embodiment Example 53, and are likewise notable for very good fiber-reactive dye properties. Applied by the known application and fixing techniques they produce in particular on cotton deep fast dyeings and prints having the hue indicated for that table example.

| | Disazo compounds of the formula (E) | | | |
|---|---|---|---|---|
| Ex. | —(B°G°)— | G | —NH—B° | Hue |
| 54 | (naphthalene with SO₃H, N=N, phenyl-CH₃) | chlorine | 4-(β-sulfato-ethylsul-fonyl)phenyl-amino | brown |
| 55 | (dimethoxyphenyl-N=N-naphthalene-SO₃H) | fluorine | 4-(β-sulfato-ethylsul-fonyl)phenyl-amino | reddish brown |
| 56 | (methoxy, methyl phenyl-N=N-naphthalene-SO₃H) | chlorine | 3-(β-sulfato-ethylsul-fonyl)phenyl-amino | brownish orange |
| 57 | (OCH₃, NH—CO—CH₃ phenyl-N=N-phenyl) | chlorine | 4-(β-sulfato-ethylsul-fonyl)phenyl-amino | brownish orange |
| 58 | (OC₂H₅, NH—COCH₃ phenyl-N=N-naphthalene-SO₃H) | chlorine | β-[4-(β-sul-fatoethylsul-fonyl)phenyl]-ethylamino | reddish brown |

We claim:
1. An azo compound conforming to the formula (1)

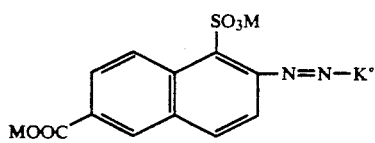

(1)

where:
M is hydrogen or a salt-forming metal atom,
K° is a radical of the formula (2A) or (2B)

(2A)

-continued

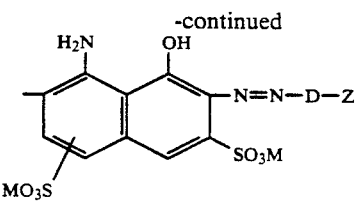

(2B)

where
M is as defined above,
Z is a radical of the formula (3)

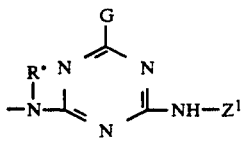 (3)

where

R⁰ is hydrogen or alkyl of 1 to 4 carbon atoms or is alkyl of 1 to 4 carbon atoms which is substituted by sulfo, carboxyl, sulfato, phosphato, hydroxyl, methoxy, ethoxy, phenyl, monosulfophenyl or disulfophenyl, G is halogen, methoxy, hydroxyl or a substituted or unsubstituted anilino radical in which one of the substituents may also be a fiber-reactive group, and $Z^1$ is a radical of the formula (3a) or (3b)

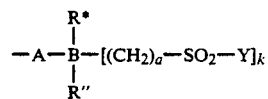 (3a)

—alk—SO$_2$—Y (3b)

where

A is a direct bond, alkylene of 2 to 6 carbon atoms, or phenylene which may be substituted by 1 or 2 substituents selected from the group consisting of methyl, ethyl, methoxy, ethoxy, chlorine, sulfo and carboxyl, B is a benzene or naphthalene radical, R* is hydrogen, alkyl of 1 to 4 carbon atoms, alkoxy of 1 to 4 carbon atoms, fluorine, bromine, chlorine, sulfo, carboxyl, carbalkoxy of 2 to 5 carbon atoms, trifluoromethyl, carbamoyl or N-(C$_1$-C$_4$-alkyl)carbamoyl, if B is a benzene ring, or is hydrogen or sulfo if B is a naphthalene ring, R" is hydrogen, alkyl of 1 to 4 carbon atoms, alkoxy of 1 to 4 carbon atoms, chlorine, nitro or sulfo, if B is a benzene ring, or is hydrogen or sulfo if B is a naphthalene radical, Y is vinyl or an ethyl group which contains in the β-position a substituent which is eliminable under alkaline conditions to leave a vinyl group, alk is alkylene of 2 to 6 carbon atoms, a is zero, 1 or 2, and k is 1 or 2, D is a radical of the formula (4)

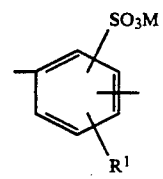 (4)

where

M is as defined above, and $R^1$ is hydrogen or alkyl of 1 to 4 carbon atoms,

E is a radical of the formula (5a), (5b), (5c) or (5d)

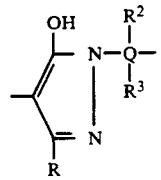 (5a)

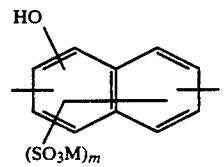 (5b)

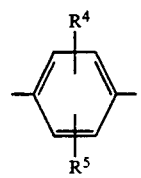 (5c)

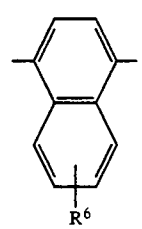 (5d)

where

R is hydrogen, alkyl of 1 to 4 carbon atoms, cyano, carboxyl, carbalkoxy of 2 to 5 carbon atoms, carbamoyl or phenyl, Q is a benzene or naphthalene radical, $R^2$ is hydrogen, alkyl of 1 to 4 carbon atoms, alkoxy of 1 to 4 carbon atoms, fluorine, bromine, chlorine, sulfo, carboxyl, carbalkoxy of 2 to 5 carbon atoms, trifluoromethyl, carbamoyl or N-(C$_1$-C$_4$-alkyl)-carbamoyl, if Q is a benzene ring, or is hydrogen or sulfo if Q is a naphthalene ring, $R^3$ is hydrogen, alkyl of 1 to 4 carbon atoms, alkoxy of 1 to 4 carbon atoms, chlorine or sulfo if Q is a benzene radical, or is hydrogen or sulfo if Q is a naphthalene radical, $R^4$ is hydrogen, alkyl of 1 to 4 carbon atoms, alkoxy of 1 to 4 carbon atoms, bromine, chlorine, trifluoromethyl, sulfo, carboxyl or cyano, $R^5$ is hydrogen, alkyl of 1 to 4 carbon atoms, alkoxy of 1 to 4 carbon atoms, chlorine, amino, alkylamino of 1 to 4 carbon atoms, alkanoylamino of 2 to 5 carbon atoms, benzoylamino, ureido, N'-phenylureido, N'-(C$_1$-C$_4$-alkyl)-ureido, phenylsulfonyl or alkylsulfonyl of 1 to 4 carbon atoms, $R^6$ is hydrogen or sulfo, M is as defined above, m is 1 or 2, v is zero or 1, and —K—N(R⁰)— is the bivalent radical of a water-soluble coupling component.

2. An azo component as claimed in claim 1, wherein —K—N(R⁰)— is a radical of the formula (6a), (6b) (6c), (6d), (6e), (6f), (6g), (6h) or (6i)

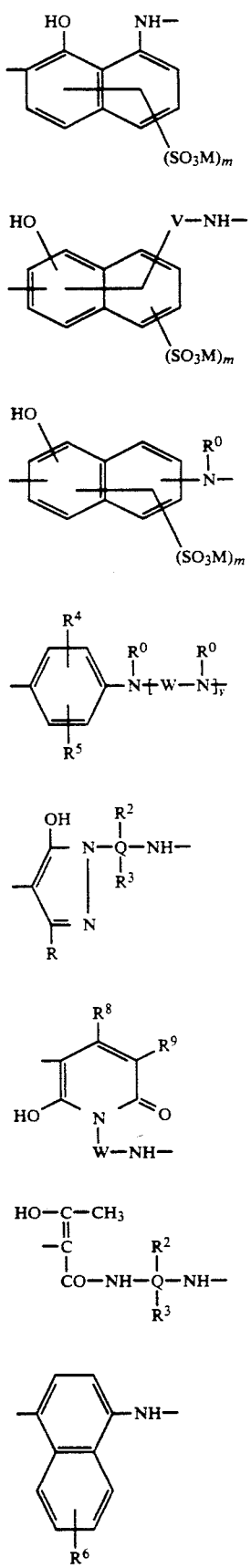

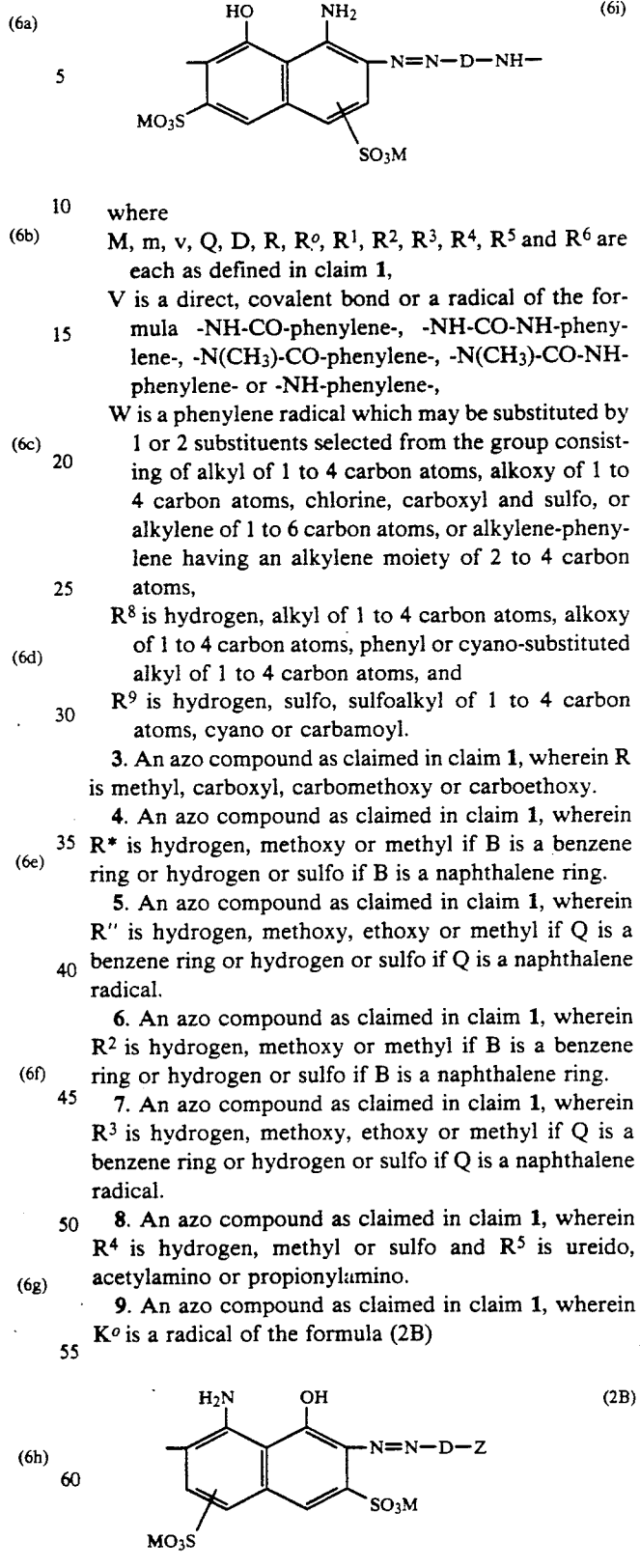

where

M, m, v, Q, D, R, R⁰, $R^1$, $R^2$, $R^3$, $R^4$, $R^5$ and $R^6$ are each as defined in claim 1, V is a direct, covalent bond or a radical of the formula -NH-CO-phenylene-, -NH-CO-NH-phenylene-, -N(CH₃)-CO-phenylene-, -N(CH₃)-CO-NH-phenylene- or -NH-phenylene-, W is a phenylene radical which may be substituted by 1 or 2 substituents selected from the group consisting of alkyl of 1 to 4 carbon atoms, alkoxy of 1 to 4 carbon atoms, chlorine, carboxyl and sulfo, or alkylene of 1 to 6 carbon atoms, or alkylene-phenylene having an alkylene moiety of 2 to 4 carbon atoms, $R^8$ is hydrogen, alkyl of 1 to 4 carbon atoms, alkoxy of 1 to 4 carbon atoms, phenyl or cyano-substituted alkyl of 1 to 4 carbon atoms, and $R^9$ is hydrogen, sulfo, sulfoalkyl of 1 to 4 carbon atoms, cyano or carbamoyl.

3. An azo compound as claimed in claim 1, wherein R is methyl, carboxyl, carbomethoxy or carboethoxy.

4. An azo compound as claimed in claim 1, wherein R* is hydrogen, methoxy or methyl if B is a benzene ring or hydrogen or sulfo if B is a naphthalene ring.

5. An azo compound as claimed in claim 1, wherein R" is hydrogen, methoxy, ethoxy or methyl if Q is a benzene ring or hydrogen or sulfo if Q is a naphthalene radical.

6. An azo compound as claimed in claim 1, wherein $R^2$ is hydrogen, methoxy or methyl if B is a benzene ring or hydrogen or sulfo if B is a naphthalene ring.

7. An azo compound as claimed in claim 1, wherein $R^3$ is hydrogen, methoxy, ethoxy or methyl if Q is a benzene ring or hydrogen or sulfo if Q is a naphthalene radical.

8. An azo compound as claimed in claim 1, wherein $R^4$ is hydrogen, methyl or sulfo and $R^5$ is ureido, acetylamino or propionylamino.

9. An azo compound as claimed in claim 1, wherein K⁰ is a radical of the formula (2B)

where M, D and Z are each as defined in claim 1 and R⁰ is hydrogen.

10. An azo compound as claimed in claim 1, wherein K⁰ is a radical of the formula 14. An azo compound as claimed in claim 1 of the formula

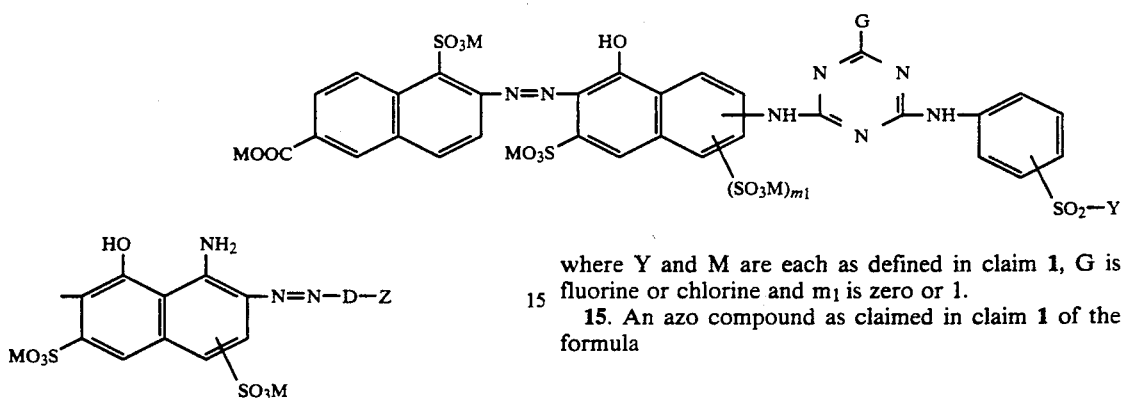

where Y and M are each as defined in claim 1, G is fluorine or chlorine and $m_1$ is zero or 1.

15. An azo compound as claimed in claim 1 of the formula

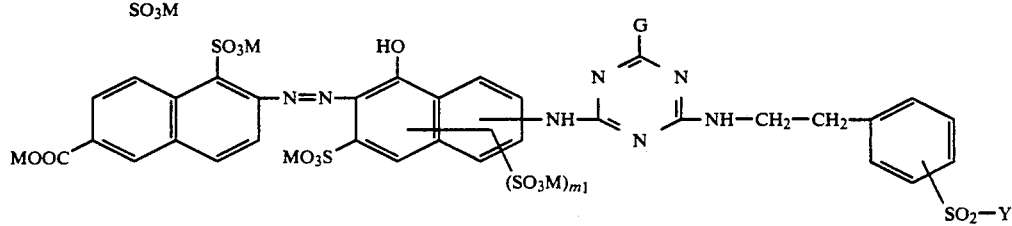

where M, D and Z are each as defined in claim 1 and $R^o$ is hydrogen.

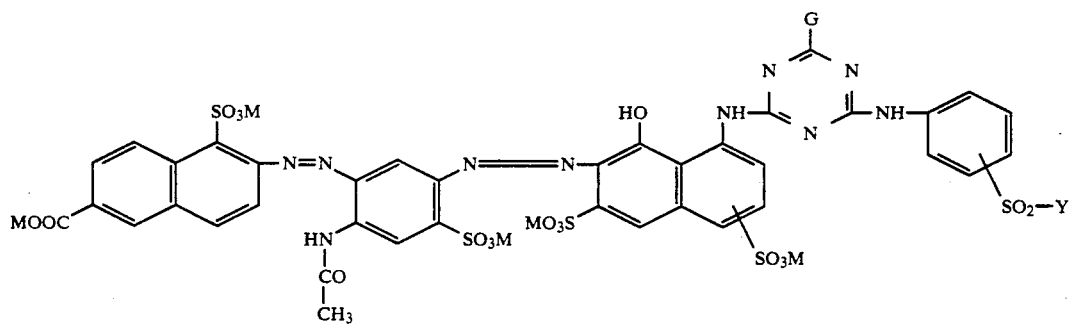

where Y and M are each as defined in claim 1, G is fluorine or chlorine and $m_1$ is zero or 1.

16. An azo compound as claimed in claim 1 of the formula

11. An azo compound as claimed in claim 1, wherein A is a direct bond.

12. An azo compound as claimed in claim 1, wherein a is zero.

13. An azo compound as claimed in claim 1, wherein G is chlorine or fluorine.

where M and Y are each as defined above and G is fluorine or chlorine.

17. An azo compound as claimed in claim 1 of the formula

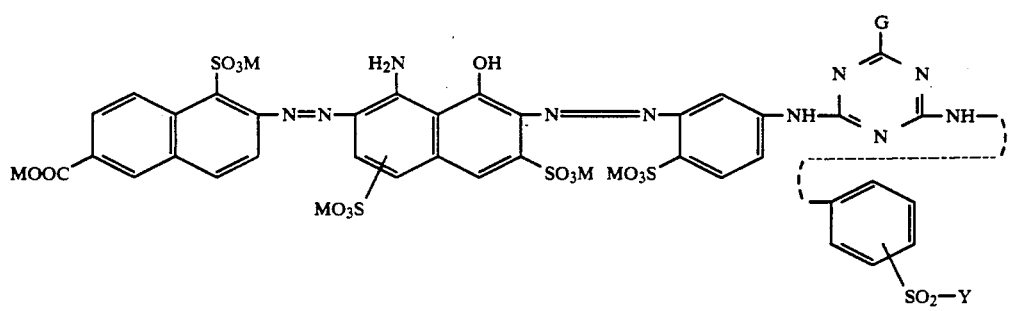

where M and Y are each as defined in claim 1 and G is fluorine or chlorine.

18. An azo compound as claimed in claim 1 of the formula

[Structural formula showing an azo compound with SO₃M, MOOC, H₂N, OH, MO₃S, SO₃M substituents on naphthalene rings, connected via N=N linkages to a D-NH group and a triazine ring with G substituent, linked to NH and a phenyl-SO₂-Y group shown in dashed brackets]

where D, M and Y are each as defined in claim 1 and G is fluorine or chlorine.

19. An azo compound as claimed in claim 1, wherein Y is vinyl or β-sulfatoethyl.

20. A process for dyeing hydroxyl- or carboxamido-containing material or hydroxyl- and carboxamido-containing material, wherein a dye is introduced onto or into the material and fixed by means of heat or with the aid of an alkaline agent or with both heat and an alkaline agent, which comprises carrying out the dyeing with a compound conforming to formula (1) of claim 1.

21. A process as claimed in claim 20, wherein said material is a fiber material.

* * * * *